United States Patent
Magerlein et al.

[15] 3,699,161
[45] Oct. 17, 1972

[54] PROCESS FOR THE PRODUCTION OF THIOPHOSGENE

[72] Inventors: Helmut Magerlein, Erlenbach; Gerhard Meyer, Obernburg; Hans-Dieter Rupp, Erlenbach, all of Germany

[73] Assignee: Glanzsoff AG, Wuppertal, Germany

[22] Filed: April 15, 1971

[21] Appl. No.: 134,495

[30] Foreign Application Priority Data

April 17, 1970 Germany..........P 20 18 381.7

[52] U.S. Cl. .............................................260/543 R
[51] Int. Cl................................................C07c 51/58
[58] Field of Search ..................................260/543 R

[56] References Cited

UNITED STATES PATENTS 3,150,176  9/1964  Foley.....................260/543 R

*Primary Examiner*—Lorraine A. Weinberger
*Assistant Examiner*—Richard D. Kelly
*Attorney*—Johnston, Root, O'Keeffe, Keil, Thompson & Shurtleff

[57] ABSTRACT

Process of producing thiophosgene by reduction of trichloromethanesulfenyl chloride with hydrogen sulfide on silica gel at 120°–180°C., preferably 130°–160° C.

10 Claims, No Drawings

PROCESS FOR THE PRODUCTION OF THIOPHOSGENE

Thiophosgene is a valuable initial reactant for the synthesis of numerous organic sulfur compounds, such as thioureas, isothiocyanates, dithiocarbamates, thiocarbonates, chlorothioformates and the like.

In the earliest known processes, thiophosgene was prepared by reacting trichloromethanesulfenyl chloride with silver dust, tin and hydrochloric acid, tin chloride, iron and hydrochloric acid, iron and acetic acid, copper powder or hydrogen sulfide. The best results were obtained by a reduction with tin and hydro-chloric acid (Dyson, Organic Syntheses, Vol. 6, pages 86 to 91), but this process is unsuitable for the production of thiophosgene on an industrial scale due to the high cost of tin and also the low yields, which are only 50 to 60 percent.

Another process is known in which trichloromethanesulfenyl chloride is reacted at elevated temperatures with hydrocarbons which either readily give off hydrogen or in which at least part of the hydrogen is easily replaced by chlorine atoms (German Pat. No. 853,162). In this process, the best results are obtained by using tetralin as the hydrocarbon. The process is uneconomical on account of the high cost of the particular hydrocarbons required. Moreover, this process has the disadvantage that the decomposition and side reactions of trichloromethanesulfenyl chloride are favored by the necessarily high reaction temperatures so that yields of only about 80 percent can be obtained.

According to a similar process, it is known that trichloromethylsulfenyl chloride can be reacted in the presence of Friedel-Crafts' catalysts at temperatures of 75°C. to 250°C. with an aromatic hydrocarbon having hydrogen atoms which are easily substituted by chlorine atoms (U.S. Pat. No. 2,668,853). The hydrocarbons used for this process are benzene or its homologs or derivatives, e.g. xylenes or chlorobenzenes. This process is uneconomical because the resulting mixtures of chlorinated hydrocarbons are difficult to utilize, and moreover the yields are again only about 80 percent of theory.

It is also known that trichloromethanesulfenyl chloride can be reduced with hydrogen (German Pat. No. 873,836). In this process, trichloromethanesulfenyl chloride and excess hydrogen are introduced into a reaction tube, which may contain inert fillers or catalyst carriers, at temperatures of 300°C. to 400°C. This process is only worthwhile if it is carried out as a cyclic continuous process, but even then this procedure is complicated and costly due to the additional separating processes required for recovering the unreacted components. Moreover, at the reaction temperatures employed, considerable quantities of trichloromethanesulfenyl chloride are decomposed by heat into carbon tetrachloride and sulfur.

Two other processes for the preparation of thiophosgene are known which involve the reaction of thiochloromethane-sulfenyl chloride, either with diethylphosphite (USSR Pat. No. 105,336) or with white phosphorus (U.S. Pat. No. 3,150,176). Although the yields in these processes are 85 percent of the theory and 91 percent of the theory, respectively, and therefore higher than in the other processes described above, thiophosgene cannot be economically prepared on an industrial scale by these processes because of the high cost of diethylphosphite and of white phosphorus.

It is also known to use sulfur dioxide as a reducing agent for the preparation of thiophosgene from trichloromethanesulfenyl chloride (French Pat. No. 1,152,827). The yields obtained by this process are only 50 to 60 percent.

Thiophosgene can be prepared by a more recently developed process involving the reaction of trichloromethanesulfenyl chloride with sulfur dioxide or hydrogen sulfide in the presence of a two phase system of water/organic solvent and with iodide ions as the catalyst (Czech Patent No. 103,963). Thiophosgene can be produced on a large industrial scale by this process if sulfur dioxide is used as reducing agent because the yield in this case is 92 percent of the theory. The reaction takes place in accordance with the following overall reaction equation:

$$Cl_3CSCl + SO_2 + 2H_2O \rightarrow Cl_2CS + H_2SO_4 + 2HCl \quad (1)$$

The aqueous phase containing sulfuric acid and hydrochloric acid as by-products must be discarded because it would be uneconomical to separate and recover the acids. The recovery of thiophosgene from the organic phase requires an expensive distillation process. If hydrogen sulfide were to be used as reducing agent in this process, the yield obtained would be only 75 percent of theory.

Hydrogen sulfide accumulates in considerable quantities in the chemical industry, e.g. from the production of carbon disulfide, and is readily available as an inexpensive reducing agent. It has therefore been of considerable interest to discover a process by which trichloromethanesulfenyl chloride could be reduced to thiophosgene in high yields by using hydrogen sulfide as the reducing agent.

Accordingly, it is the primary object of the invention to provide an economical and effective commercial process for producing thiophosgene from trichloromethanesulfenyl chloride and hydrogen sulfide.

According to the invention, this object is achieved so as to produce thiophosgene in high yields by carrying out the reduction of trichloromethanesulfenyl chloride with hydrogen sulfide at temperatures in the range of approximately 120°C. to 180°C. and in contact with silica gel.

When trichloromethanesulfenyl chloride is treated with hydrogen sulfide at elevated temperatures, it reacts primarily in accordance with Equation 2 to form thiophosgene:

$$CCl_3CSCl + H_2S \rightarrow Cl_2CS + 2HCl + S \quad (2)$$

The other products of the reaction are hydrogen chloride and sulfur. In addition to this main reaction, two side reactions take place in which bis-(trichloromethyl)-trisulfide is formed in accordance with the Equation 3 and carbon disulfide in accordance with Equation 4.

$$2 Cl_3CSCl + H_2S \rightarrow Cl_3CSSSCCl_3 + HCl \quad (3)$$

$$Cl_3CSCl + 2 H_2S \rightarrow CS_2 + 4 HCl + S \quad (4)$$

The reaction of trichloromethanesulfenyl chloride with hydrogen sulfide takes place extremely rapidly in contact with silica gel so that this reaction can unexpectedly be carried out at temperatures above 120°C., preferably at least about 130°C., without decomposition of trichloromethanesulfenyl chloride into carbon tetrachloride and sulfur taking place in accordance with Equation 5.

$$Cl_3CSCl \rightarrow CCl_4 + S \tag{5}$$

The reaction of the invention is advantageously carried out at temperatures in the range of about 130°C. to 160°C. because no bis-(trichloromethyl) trisulfide is formed under these conditions. The formation of carbon disulfide according to Equation 4 is also largely suppressed at this temperature range so that thiophosgene is obtained in very high yields. It is only above 160°C. that carbon disulfide is increasingly formed as a by-product in accordance with Equation 4.

In the process according to the invention, trichloromethanesulfenyl chloride and hydrogen sulfide are advantageously used in equivalent quantities, i.e. in stoichiometric proportions of 1:1 in accordance with Equation 2. An excess of hydrogen sulfide favors the formation of carbon disulfide whereas an excess of trichloromethanesulfenyl chloride is uneconomical because the unreacted portion must be separated and returned to the reaction.

Ordinary commercially available types of silica gel are used for the process of the invention, preferably a xerogel or even an aerogel in the form of relatively large agglomerate particles. Silica gels having a particle size range of 1.5 to 3 mm. (agglomerate particles) and a bulk density, i.e. the "apparent density" or so-called "gel density", of 0.6 to 0.9 g/cc. have been found to be especially suitable. The silica gel is preferably dried at 120°C. to 150°C. before use.

The preparation of a silica gel having a reasonably rigid agglomerate structure and particle size sufficient to form a fixed catalytic bed can be carried out by known methods, and there is a wide range of selection of suitable silica gels in the commercial market. A xerogel is a silica gel from which the liquid phase has been evaporated so as to form a more or less hard agglomerate of ultimate silica particles. The particle size referred to above as being especially preferred is the particle size of the agglomerate and not the primary or ultimate particle size which may be on the order of 3 to 30 millimicrons. In general, these ultimate particle sizes can range from as low as 1–20 millimicrons to more than 1,000 millimicrons. Also, it should be noted that the bulk or apparent density of the agglomerate particles of silica gel is the weight per unit volume in the fixed bed, as distinguished from the so-called "packing density" as defined by E. Manegold, "Kolloid-Z.", Vol. 96 page 186 (1941), under the formula $$S = 0.455/(Vp + 0.455)$$

wherein S is the packing density and Vp is the micropore volume in cc. per gram.

In general, it is desirable to employ a silica gel of relatively high surface area per unit weight, consistent with a stable catalyst bed. However, this value of specific surface area can be varied within wide limits, usually in a range of at least 100 m²/g or approximately 200 to 800 m²/g. Even relatively dense silica gel powders with a rather low specific surface area can be employed. The following table therefore summarizes the preferred and most advantageous ranges of the physical properties of the catalytic silica gel of the invention:

TABLE

| Property | Range Broad | Narrow |
|---|---|---|
| Particle size, agglomerate (mm.) | 0.2–8 | 1.5–3.0 |
| Bulk density (g/cc.) | 0.1–0.9 | 0.6–0.9 |
| Ultimate particles size (millimicrons) | 1–1000 | 3–30 |
| Packing density (g/cc.) | 0.18–0.6 | 0.3–0.5 |
| Specific surface area (m²/g) | 100–800 | 300–700 |
| Micropore volume (cc./g) | 0.3–2.0 | 0.4–0.9 |
| Average pore diameter (A) | 10–200 | 20–80 |

It will be recognized that the invention is not dependent upon the selection of a specific silica gel other than when achieving the most advantageous results within the narrow ranges given in the preceding table.

The reaction mixture obtained from the process according to the invention consists essentially of liquid sulfur and a gaseous mixture of thiophosgene, hydrogen chloride and small quantities of carbon disulfide. The gas mixture can be worked up in a conventional manner, e.g. by fractional condensation. A very pure thiophosgene is easily obtained in this method of separation and recovery of gaseous products.

The process according to the invention may be carried out either continuously or intermittently by various methods. The reaction is preferably carried out continuously in a reaction tube or elongated tubular reaction zone which is filled with the particles of silica gel as a fixed bed and into which trichloromethanesulfenyl chloride and hydrogen sulfide are introduced, a temperature of 130°C. to 160°C. preferably being maintained in the reaction zone.

It has been found that the best results are obtained when the reactants are passed through the reaction tube in the same direction, i.e. with cocurrent flow of both reactants. The stoichiometric amounts of trichloromethanesulfenyl chloride and hydrogen sulfide are most advantageously both introduced into the top of a reaction tube which is filled with the silica gel while the gaseous mixture of thiophosgene, carbon disulfide and hydrogen chloride and the liquid sulfur are removed from the lower end of the reaction tube.

The yield obtained in the process according to the invention is 94 percent of theory. In none of the previously known processes can thiophosgene be obtained consistently in such high yields.

The process according to the invention is further distinguished from most of the known processes in being very economical since hydrogen sulfide, which is much less expensive, is used as the reactant for trichloromethanesulfenyl chloride and a high yield is obtained. When compared with the process according to Czech Pat. No. 103,963, in which thiophosgene is obtained in a 92 percent yield by using sulfur dioxide, the process according to the invention is distinguished by its simplicity; in particular, the known process is much more complicated in that it requires a solvent which must be circulated with the catalyst. Moreover, part of the catalyst is lost by reaction with the impurities in the reaction mixture and must therefore be replaced. The quantity of catalyst required therefore depends on the purity of the starting material and of the solvent used and must therefore be determined analytically. In the process according to the invention, on the other hand, no solvent is required. The silica gel catalyst is not used up in the reaction and does not lose its activity even after prolonged use.

The process is more fully illustrated by the following example.

EXAMPLE

A double-walled glass reaction tube having a length of 1 meter and an internal diameter of 15 mm. is filled with 120 grams of silica gel (particle size 1.5 to 3 mm., bulk density 0.7 grams/cc.) was used. The tube was heated to and maintained at a temperature of 135°C., controlled by means of a circulation thermostat.

17.75 grams/hour (95 m mol/hr) of trichloromethanesulfenyl chloride and 3.25 grams/hour (95 m mol/hr) of hydrogen sulfide were continuously introduced through two feed pipes at the head of the reaction tube by means of a dosing pump. The liquid sulfur formed was collected in a flask heated to 135°C. at the lower end of the reaction tube and was not contaminated with trichloromethanesulfenyl chloride. The gaseous reaction products were also removed at the lower end of the reaction tube. The gases in the product were condensed in a condenser and collected in a wash bottle which was filled with half concentrated hydrochloric acid and cooled to 0°C. After an initial period of 5 hours, constant conditions had become established in the reaction tube. The organic phase forming in the wash bottle was then removed at the rate of 10.75 grams/hour. It consisted of 96 percent by weight of thiophosgene and 4 percent by weight of carbon disulfide and was free from trichloromethanesulfenyl chloride. The overall conversion was therefore quantitative and the yield of thiophosgene was 94 percent of the theory.

In an alternative procedure the gaseous mixture withdrawn at the lower end of the reaction tube is fractionally condensed after achieving constant conditions in the reaction, thereby separating approximately the same amount of thiophosgene as the main product. The HCl can be readily absorbed in water to complete the separation of gases. No special solvents or recycle streams are required, and the silica gel catalyst exhibits a very long life. The number and amount of by-products is quite limited.

The invention is hereby claimed as follows:

1. A process for the production of thiophosgene which comprises reducing trichloromethanesulfenyl chloride by reaction with hydrogen sulfide at a temperature between about 120°C. and 180°C. and in contact with silica gel.

2. A process as claimed in claim 1 wherein the reaction is carried out at a temperature of about 130°C. to 160°C.

3. A process as claimed in claim 1 wherein said trichloromethanesulfenyl chloride and hydrogen sulfide are reacted in approximately stoichiometric amounts.

4. A process as claimed in claim 1 wherein said silica gel has a particle size of about 1.5 to 3.0 mm. and a bulk density in the range of approximately 0.6 to 0.9 g/cm$^3$.

5. A process as claimed in claim 1 carried out continuously by passing said trichloromethanesulfenyl chloride and hydrogen sulfide cocurrently through a fixed bed of silica gel in an elongated tubular reaction zone maintained at said temperature of between about 120°C. and 180°C.

6. A process as claimed in claim 5 wherein said trichloromethanesulfenyl chloride and hydrogen sulfide are continuously introduced into said reaction zone in approximately stoichiometric amounts.

7. A process as claimed in claim 6 wherein the temperature in said reaction zone is about 130°C. to 160°C.

8. A process as claimed in claim 5 wherein the reactants are introduced into the top of a vertically positioned reaction tube packed with said silica gel and the reaction products are removed at the lower end of the reaction tube.

9. A process as claimed in claim 8 wherein said silica gel has a particle size of about 1.5 to 3.0 mm. and a bulk density in the range of approximately 0.6 to 0.9 g/cm$^3$.

10. A process as claimed in claim 8 wherein the reaction products removed at the lower end of the reaction tube include liquid sulfur and a gaseous mixture of thiophosgene, carbon disulfide and hydrogen chloride, the gases being separated from the liquid sulfur and then fractionally condensed to separate and recover said thiophosgene.

* * * * *